Patented Aug. 31, 1954

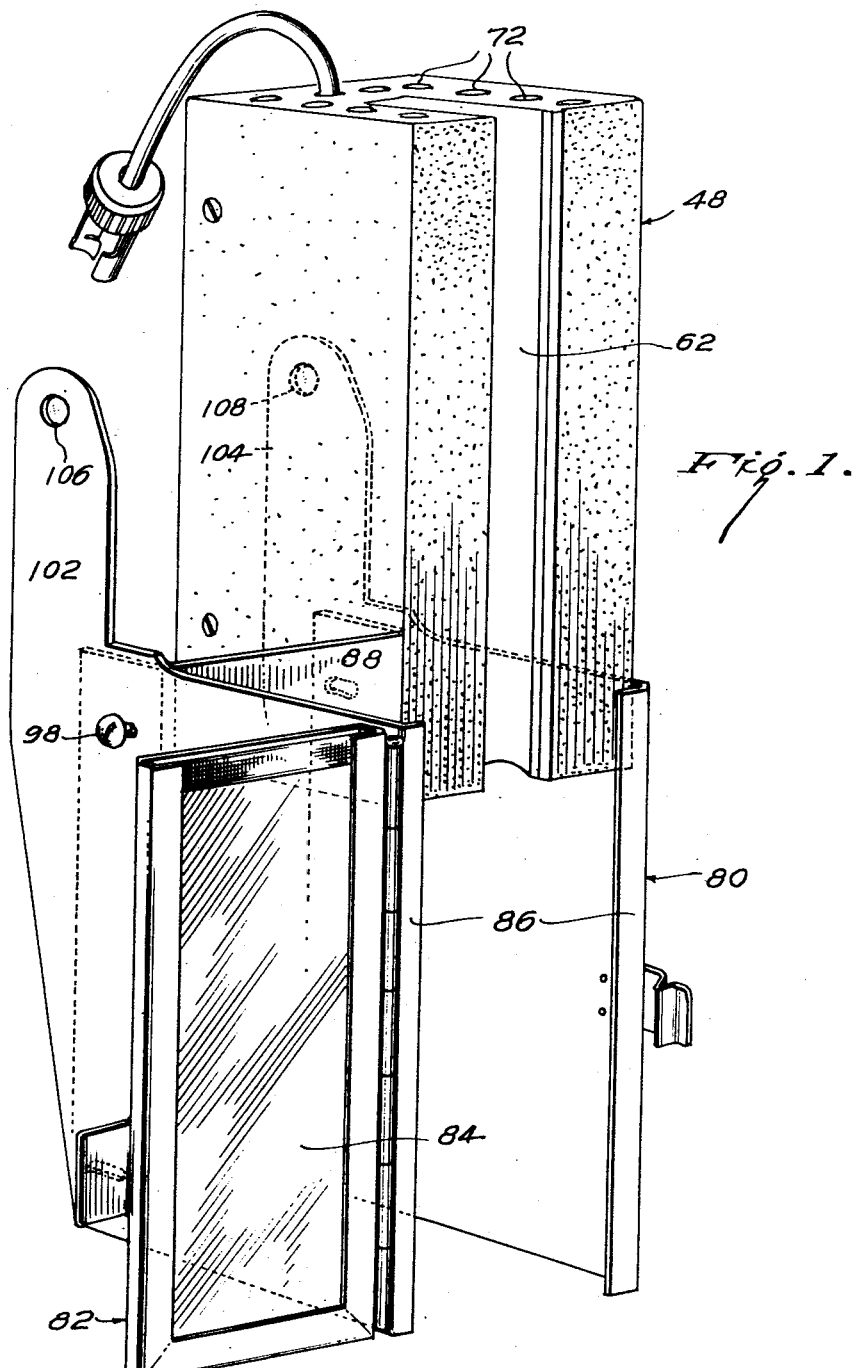

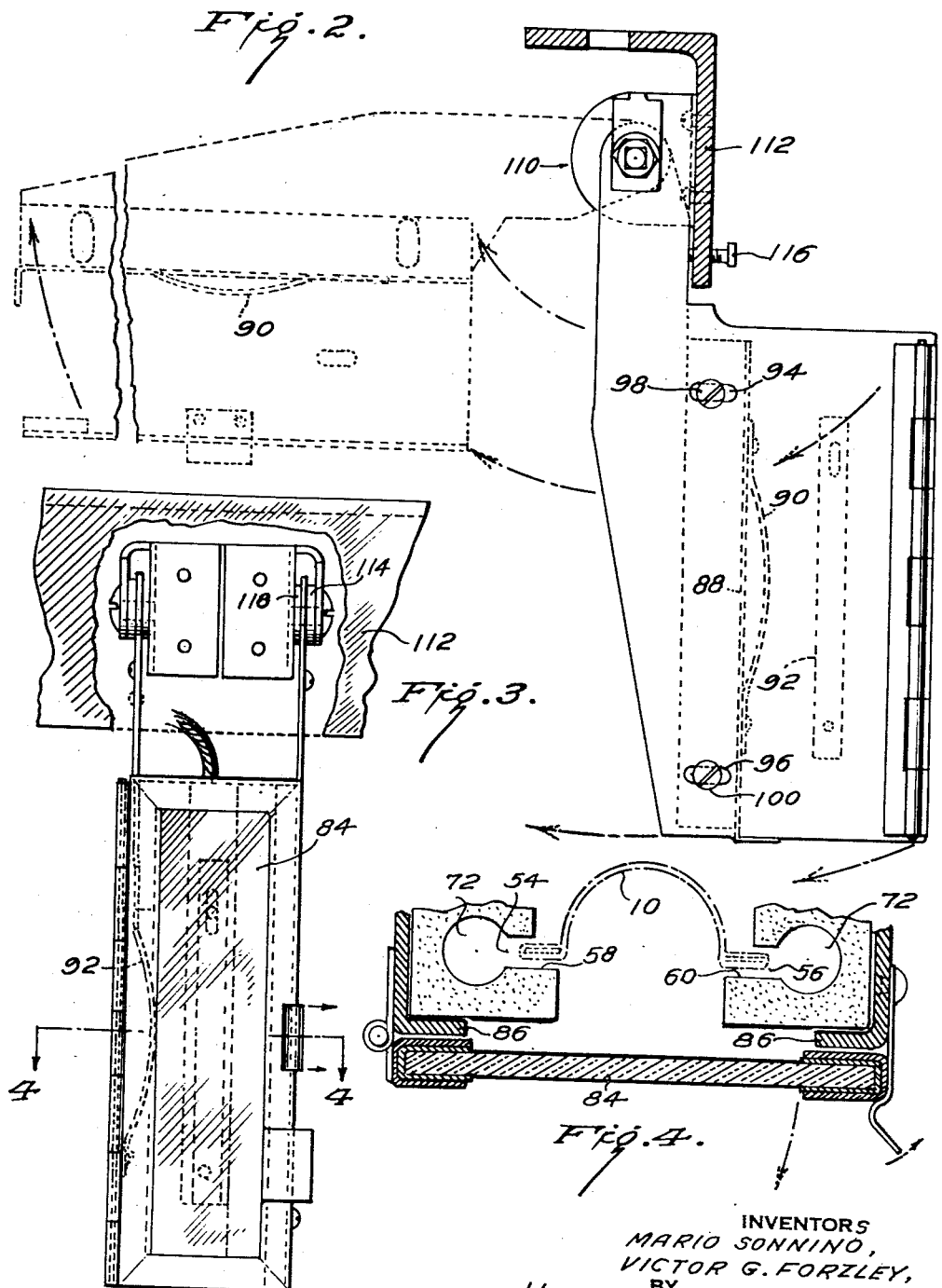

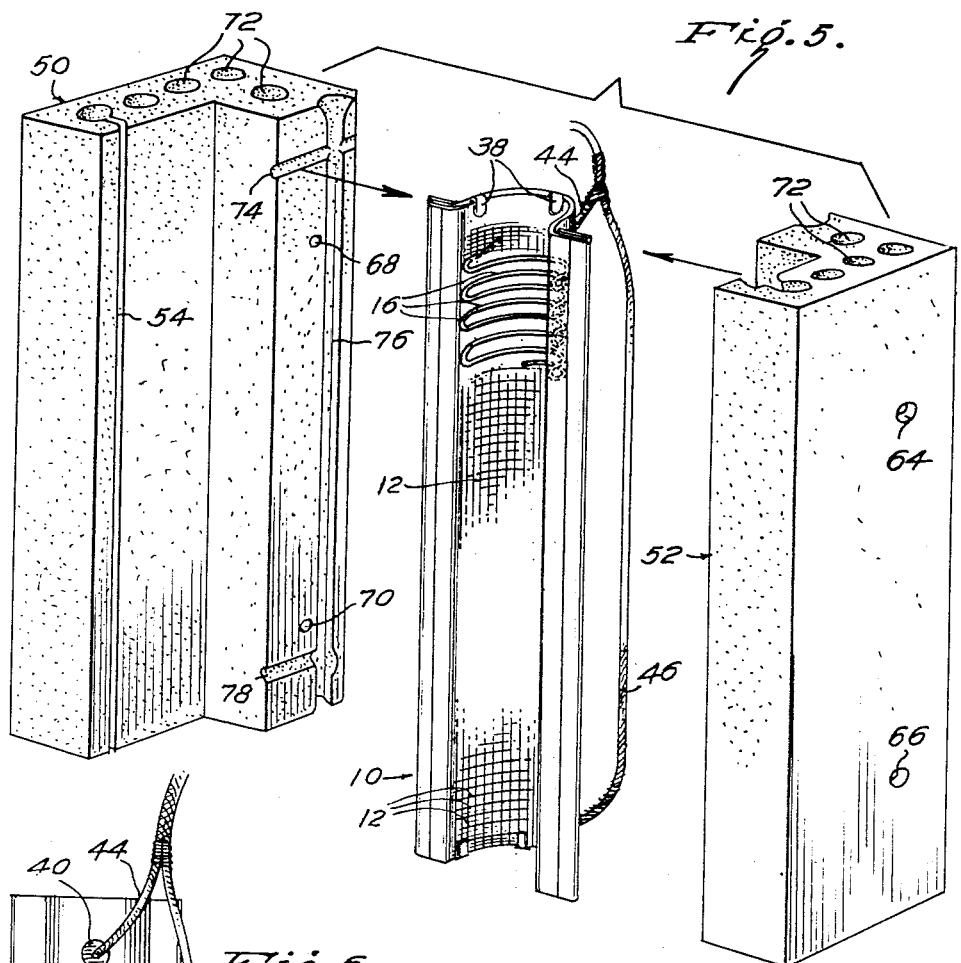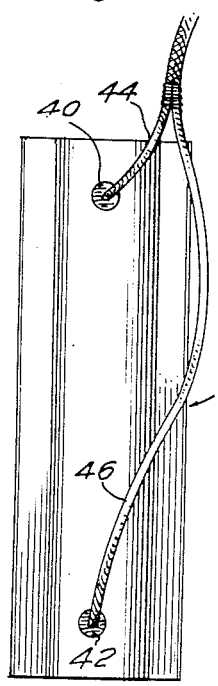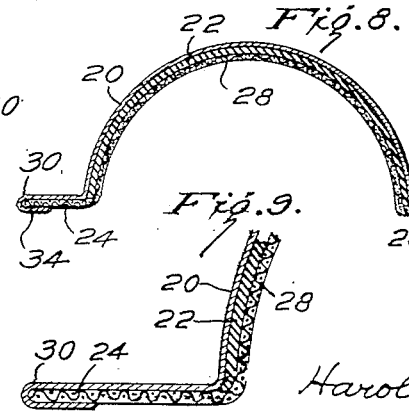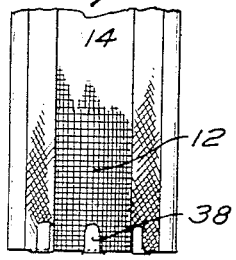
INVENTORS
MARIO SONNINO,
VICTOR G. FORZLEY,
BY
Harold L. Kauffman
ATTORNEY

2,688,067

UNITED STATES PATENT OFFICE 2,688,067

APPARATUS ADAPTED FOR THE HEAT TREATMENT OF MOVING FILAMENTARY MATERIAL

Mario Sonnino and Victor G. Forzley, Stamford, Conn., assignors to American Cyanamid Company, New York, N. Y., a corporation of Maine Application October 17, 1952, Serial No. 315,338

6 Claims. (Cl. 219—19)

This invention relates to apparatus which is especially adapted for use in the heat treatment of moving filamentary material. For instance, the apparatus can be employed in wire-annealing processes; in curing in situ wire coatings, e. g., curable resinous coatings which have been extruded on or otherwise applied to wires; in curing in situ the resin of resin-impregnated filaments and threads formed of natural or synthetic fibers; in heat treating dry filamentary material of synthetic origin (e. g., polyacrylonitrile fibers), while in a relaxed state, in order to improve its useful properties, for instance lower shrinkage and improved elongation characteristics; in thermally stretching synthetic filalmentary material; and for numerous other purposes. The apparatus of this invention is particularly valuable when incorporated into a machine for the production of continuous-filament synthetic yarn, such as one formed of a polymer of acrylonitrile.

Apparatus of the general character of that with which the present invention is concerned is broadly old, and is disclosed, for instance, in the following U. S. Patents: 2,445,042—Silverman, 2,456,384—Conaway, and 2,558,733—Cresswell et al.

The apparatus heretofore suggested or employed in the heat treatment of moving filamentary material generally has comprised a machined steel block with a V-slot, which was heated by electrical heaters of the cartridge type. The block was surrounded by insulation, and it was bulky and inefficient.

It is an object of the present invention to provide new and improved apparatus adapted for use in heat treating moving filamentary material, which apparatus is relatively light in weight, compact, economical to construct, and also economical to operate due mainly to the type and location of the heating element and the efficient utilization of both heat and insulation.

It is a further object of the invention to provide apparatus of the general character above-identified which can be readily moved to or from its normal operating position and which can readily and advantageously be incorporated into a machine for the production of continuous-filament synthetic yarn.

Other objects of the invention will be apparent to those skilled in the art from the following more detailed description when considered in connection with the accompanying drawings, which illustrate a preferred embodiment of the invention, and wherein Fig. 1 is a perspective view of part of the apparatus, showing a casing and the heating-element support which fits therein raised from its normal position;

Fig. 2 is a side elevational view showing the furnace portion of the apparatus, pivotally mounted on a support, in the operating position employed when the moving filamentary material is passing therethrough in a vertical position and, also, its position when not in use;

Fig. 3 is a front elevational view of the apparatus shown in Fig. 2;

Fig. 4 is a cross-section on line 4—4 of Fig. 3;

Fig. 5 is a perspective view of part of the apparatus, the heating-element support shown in Fig. 1 being depicted as pulled apart for purpose of clarity and the heating element which the said support is adapted to receive being shown between the sections of the aforesaid support;

Fig. 6 is a rear elevational view of the heating element shown in Fig. 5;

Fig. 7 is a front elevational view of a portion of the heating element shown in Fig. 5;

Fig. 8 is a cross-sectional view of the heating element shown in Fig. 5; and

Fig. 9 is an enlarged cross-sectional view of a portion of the heating element shown in Fig. 5.

Referring to the drawing and especially to Figs. 5—9 thereof the heating element 10 is so shaped, e. g., U-shaped, that, in operation, the moving filamentary material to be heat treated can be led in close proximity to the heating surfaces thereof. This heating element comprises (a) a tape or fabric 12 (Figs. 5 and 7) formed of electrical resistance wire, e. g., Nichrome wire, and filaments or threads of inorganic insulating material, e. g., glass fibers, asbestos fibers, etc., and (b) an insulated support 14 for this tape.

The tape 12 is an important and essential element of the apparatus of this invention, and contributes much to the successful operation of the device. By embodying the resistance wire in a tape and using this tape in the structure herein described, sufficient heat is evolved at the right place for the required purpose. Furthermore, the arrangement of the surrounding thermal insulation prevents undue loss of heat while permitting sufficient dissipation of the conducted heat, so that the unit does not become too hot on its external surfaces for an operator to handle when necessary, and avoids local overheating that would tend to cause the resistance wire to overheat and burn out after a relatively short period of operation.

In a preferred embodiment of the invention the tape 12 is formed of electrical resistance wire 16 and filaments or threads of glass fibers or other suitable inorganic insulating material. In the preferred tape the resistance wire preferably constitutes the weft of the tape (as shown in Fig. 5) and the threads of glass fibers or the like constitute the warp, but in some cases the reverse tape construction may be desirable. In a portion of the heating element shown in Fig. 5, the warp threads of glass fibers are shown as removed in order to expose the wire and to illustrate more clearly the construction of the tape.

The tape 12 is mounted on a suitable insulated support 14 (Fig. 7). Referring to Figs. 8 and 9, this support comprises a backing member 20 and a layer 22 of thermal insulation interposed and held in place between the said tape and backing member. The backing member may be formed of any suitable heat-resistant material that can be shaped, e. g., into a U-shape. For instance, the backing member may be made of relatively thin metal. Advantageously the backing member is formed of a heat-reflecting metal, e. g., sheet tin, tinned sheet iron, sheet aluminum or aluminum alloys, chromium-plated sheet steel, etc.

The insulating layer 22 may be constituted of any suitable thermal insulation, e. g., glass fibers, asbestos fibers, mixtures of glass fibers and asbestos fibers, rock wool, etc., in felted, fabric or other form. We have found that a tape formed of asbestos fibers is well suited for use.

Referring again to the tape 12, it should be mentioned that the longitudinal edges or selvages 24 and 26 (Figs. 8 and 9) of the tape do not contain any resistance wire in the weft or warp of the tape, these edges being formed of woven glass fibers alone or of other woven threads of inorganic insulating material such as are used in combination with the resistance wire to make the main or heating portion 28 (Figs. 8 and 9) of the tape.

In constructing the heating element 10, or in replacing a burned-out tape, the edges 30 and 32 of the backing member 20 are turned over as shown at 34 and 36 so as to clamp and to retain fixedly in position the longitudinal edges or selvages 24 and 26 of the tape 12. If the layer 22 of thermal insulation is of such width that it extends over the edges 30 and 32 it may similarly be clamped and retained in position in the same manner as the edges 24 and 26 of the tape 12. The ends of the tape 12 and of the layer of thermal insulation 22 are clamped and held fixedly in position by suitable end clamps 38. These conveniently may take the form of narrow extensions of the backing member 20, which extensions can be folded over so as to clamp firmly to the backing member the ends of the tape 12 and of the thermally insulating layer 22.

The backing member 20 is provided with suitable openings 40 and 42 (Fig. 6) for the passage therethrough of the ends of the resistance wire 16 and so that connections readily can be made with current lead-in wire 44 and return wire 46. The ends of the resistance wire 16 are suitably connected to the lead-in and return wires and are covered with suitable electrical insulation, e. g., Scotch tape formed of glass fibers.

The heating element 10 is positioned in the heating-element support 48 (Fig. 1), which is formed of suitable thermal insulation, e. g., light-weight ceramic material, asbestos-base sheet or board (advantageously the asbestos product which is produced and sold by Johns-Manville Corpn., New York, N. Y., under the trade name of Marinite A), etc. The slotted support 48, it will be noted, is adapted to receive the heating element 10. To attain this latter objective, the support 48 advantageously may be constructed as shown in Fig. 5. As there shown, the support 48 is constructed of molded, machined or otherwise fabricated, detachably united, longitudinal sections 50 and 52 of thermal insulation. Grooves 54 and 56 (Fig. 4) are provided in the support 48, and into these fit the edges 30 and 32 of the backing member of the heating element. The frontal edges 58 and 60 of the support 48 further aid in holding the heating element 10 in position in the slot 62 (Fig. 1), which is formed when the matching sections 50 and 52 are brought together and united, e. g., by means of tie rods (the heads of which are flush with the surface). Such tie rods or threaded bolts pass through the openings 64, 66, 68 and 70 in the support 48.

The walls defining the slot 62 have a plurality of holes 72 extending longitudinally therethrough. These holes reduce thermal conduction and aid in convection cooling of the support 48 so that its outside temperature will be moderate.

The recesses 74, 76 and 78 (Fig. 5) in the section 50 match corresponding recesses in the section 52 so that when the sections are brought together they form openings for the passage therethrough of the wires which connect the heating element 10 with a source of electrical energy.

The casing 80 (Fig. 1) is formed of suitable material, e. g., metal such as sheet iron, sheet stainless steel, molded or laminated heat-resistant plastic material, etc., and preferably is provided with a frontal door 82 having a heat-resistant transparent section 84 (formed, for example, of Pyrex glass) for visual observation of the filamentary material when the heat-treating furnace is in use. The door 82, when closed, shields the heated chamber from drafts. The casing 80 is adapted to be supported in position for receiving the moving filamentary material and to receive and hold therein the slotted heating-element support 48, which latter in turn holds the heating element 10. The support 48 is slidably removable from the casing 80 as is clearly shown in Fig. 1, which is a matter of considerable practical convenience as will readily be appreciated by those skilled in the art.

The frontal edges 86 of the casing aid in holding and positioning the support 48, as does also the adjustable rear wall 88 (Fig. 1). This wall advantageously is provided with spring-tensioning means 90 (Fig. 2) for maintaining tension on the support 48 and thus uniformly positioning the latter. If desired (although it is usually not necessary) similar spring-tensioning means may be provided in one or both of the side walls of the casing 80, one of which is shown for purpose of illustration at 92 (Figs. 2 and 3). The openings in the side walls (two of which are shown at 94 and 96 in Fig. 2) into which fit threaded bolts with a notched head, and which are tightened by means of nuts on the opposite side, provide means for adjusting the rear wall so that the slotted support 48 more firmly can be held in position when required. The construction and positioning of rear wall 88 are most clearly shown in Fig. 1. Two of the bolt heads to which reference has just been made are shown at 98 and 100 in Fig. 2.

The apparatus of this invention includes within its scope a suitable support for the heat-treating furnace hereinbefore described, as well as means for mounting the aforesaid furnace upon the support so that the furnace can be moved, when not in use, from its normal operating position. One suitable form of support and mounting means is shown in Figs. 2 and 3. The extensions 102 and 104 (Fig. 1) and the openings 106 and 108 in the ends thereof provide means for pivotally mounting, as shown at 110, the heat-treating furnace upon a support. The pivot mounting is detachably united to the frame 112. The friction pivot formed of, for example, fiber washers 114 and 118 allows the furnace to be moved out of the way when not in use. Stop screws, one of which is shown at 116, and which cooperate with extension 102, are provided in order to adjust the running or operating position of the furnace and to permit the ready duplication of the setting after it has been determined.

Reference is made to Cresswell et al. Patent No. 2,558,733 for a description of a heat-treating operation in the carrying out of which the apparatus of the present invention is particularly suitable for use.

We claim:

1. Apparatus having a longitudinal passageway therethrough and which therefore is adapted for the heat treatment of moving filamentary material, said apparatus including a support comprised of thermal insulation and which is adapted to receive a heating element; and a heating element removably positioned in said support, said heating element being so shaped that the moving filamentary material can be led in close proximity to the heating surfaces thereof and comprising a tape formed of electrical resistance wire and threads of inorganic insulating material and an insulated support for said tape.

2. Apparatus as in claim 1 wherein the tape is formed of electrical resistance wire and glass fibers.

3. Apparatus as in claim 1 wherein the heating element comprises a tape formed of electrical resistance wire and glass fibers, a backing member and a layer of thermal insulation interposed between said tape and backing member.

4. Apparatus having a longitudinal passageway therethrough and which therefore is adapted for the heat treatment of moving filamentary material, said apparatus including a slotted support comprised of thermal insulation and which is adapted to receive a heating element in the slot thereof, the walls defining said slot having a plurality of holes extending longitudinally therethrough; and a U-shaped heating element removably positioned in said slot and comprising a tape formed of electrical resistance wire interwoven with glass fibers, a U-shaped metallic backing member and asbestos insulation interposed between said tape and backing member.

5. Apparatus having a longitudinal passageway therethrough and which therefore is adapted for the heat treatment of moving filamentary material, said apparatus including a casing adapted to be supported in position for receiving the said moving material and to hold therein a slotted support; a slotted support removably positioned within said casing and comprised of thermal insulation, said support being adapted to receive a heating element in the slot thereof, and the walls defining said slot having a plurality of holes extending longitudinally therethrough; and a U-shaped heating element removably positioned in said slot and comprising a tape formed of electrical resistance wire and threads of inorganic insulating material and an insulated support for said tape.

6. Apparatus comprising, in combination, a heat-treating furnace having a longitudinal passageway therethrough and which therefore is adapted for the heat treatment of moving filamentary material, said furnace including a casing having a frontal door provided with a heat-resistant transparent section for visual observation of the filamentary material when the said furnace is in use and an adjustable rear wall having spring means for maintaining tension on a slotted support which the said casing is adapted to receive, a slotted support removably positioned within said casing, said support being comprised of detachably united, longitudinal sections of thermal insulation, said support being adapted to receive a heating element in the slot thereof, and the walls defining said slot having a plurality of holes extending longitudinally therethrough, a U-shaped heating element removably positioned in said slot and comprising a tape formed of electrical resistance wire and glass fibers, a U-shaped metallic, heat-reflecting, backing member and asbestos insulation in fabric form interposed between said tape and backing member; a support for said heat-treating furnace; and means for mounting said furnace upon said support so that the furnace can be moved, when not in use, from its normal operating position.

References Cited in the file of this patent

UNITED STATES PATENTS

| Number | Name | Date |
|---|---|---|
| 882,691 | Kaisser | Mar. 24, 1900 |
| 1,321,462 | Line | Nov. 11, 1919 |
| 1,822,022 | Gay | Sept. 8, 1931 |
| 2,022,662 | Geyser | Dec. 3, 1935 |
| 2,204,603 | Kline et al. | June 18, 1940 |
| 2,222,817 | Kline et al. | Nov. 26, 1940 |
| 2,255,518 | Norton | Sept. 9, 1941 |
| 2,412,843 | Spraragen | Dec. 17, 1946 |
| 2,456,384 | Conaway | Dec. 14, 1948 |